June 14, 1949.  G. R. CHADSEY  2,473,009
BULB SOCKET MANIPULATOR
Filed April 12, 1946  2 Sheets-Sheet 1
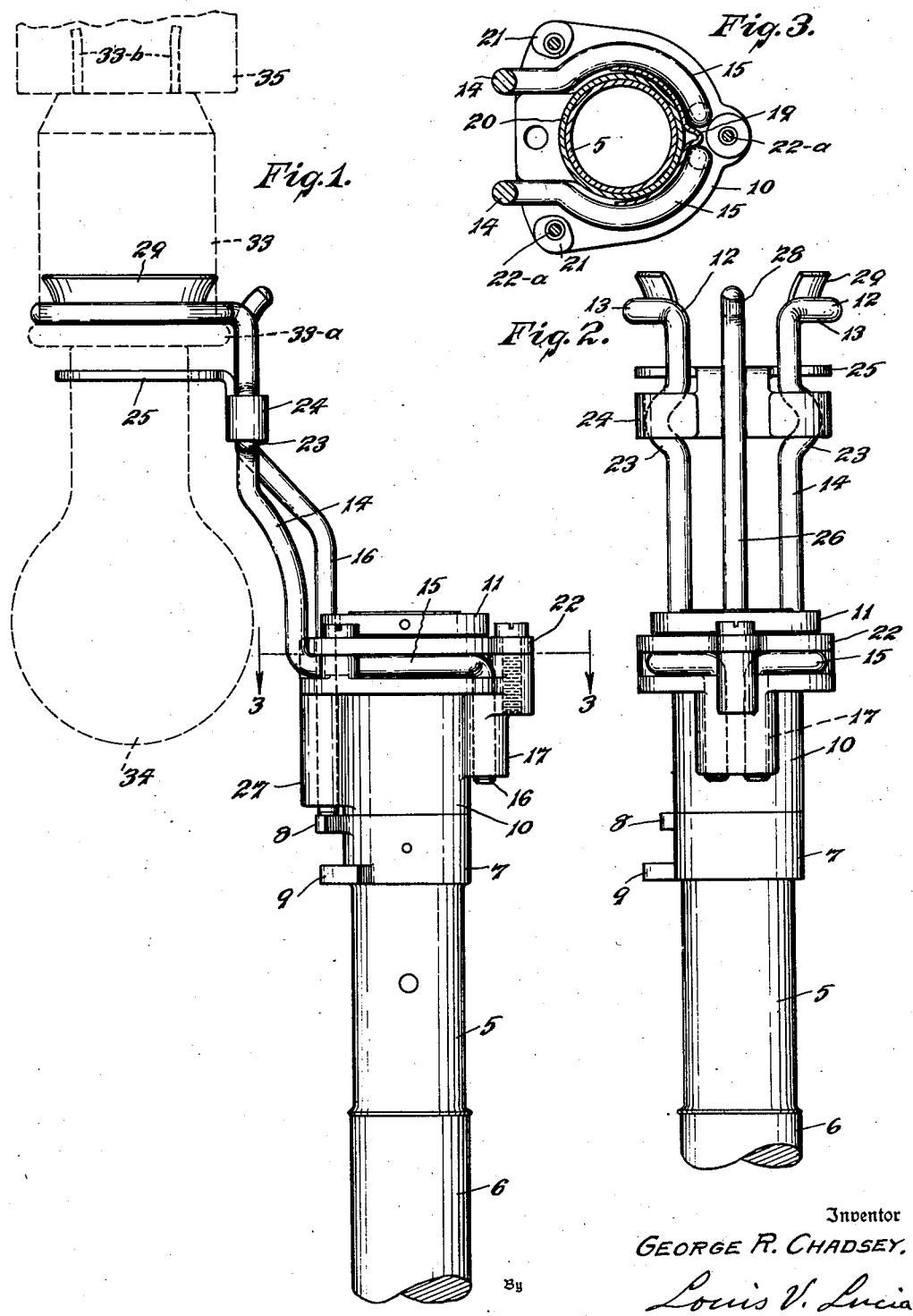
Inventor
GEORGE R. CHADSEY.
Louis V. Lucia
Attorney

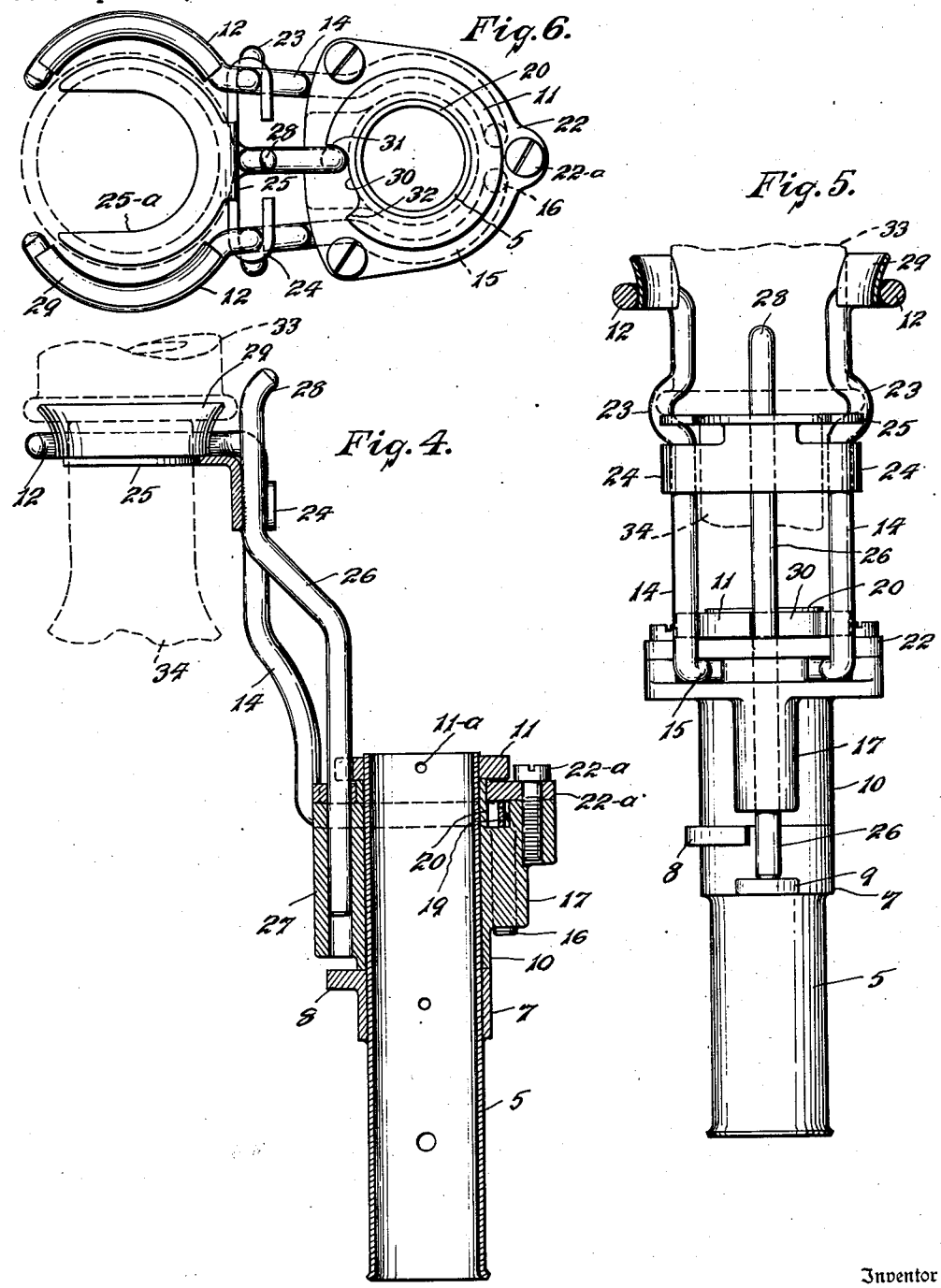

Patented June 14, 1949

2,473,009

UNITED STATES PATENT OFFICE 2,473,009

BULB SOCKET MANIPULATOR

George R. Chadsey, East Hampton, Conn.; Inez M. Davis and Ida D. Dickerson, both of Middletown, Conn., executrices of said George R. Chadsey, deceased, assignors to Chadsey Corporation, Hartford, Conn., a corporaion of Connecticut Application April 12, 1946, Serial No. 661,796

10 Claims. (Cl. 294—20)

1

This invention relates to an electric light bulb socket manipulator and more particularly to a device for reaching and gripping bulb sockets which are in out of reach positions.

An object of the present invention is to provide such a device which is easy to operate, and which will firmly and securely grasp a bulb socket for manipulation thereof in removing it from, or inserting it into a holder.

A further object of my invention is to provide a device which is particularly durable and strong.

Further objects and advantages of my invention will be more clearly understood from the following description and from the accompanying drawing, in which—

Fig. 1 is an elevational side view of a device embodying my invention and showing the same in gripping position upon an electric light bulb socket.

Fig. 2 is an elevational rear view of said device.

Fig. 3 is a plan view in section, on the line 3—3 of Fig. 2.

Fig. 4 is a side view, in central vertical section, showing the device as set in position to be moved into gripping position upon the socket.

Fig. 5 is an elevational front view showing the device in open position wherein the bulb socket is released.

Fig. 6 is an elevational plan view of the said device as shown in Fig. 4.

As shown in the drawings, the device is preferably constructed in a form wherein it comprises a shell 5 that is adapted to be mounted upon the end of a pole 6 which may be of any desired length. A supporting collar 7 is secured to the shell 5, by soldering or brazing it thereto, and has stops 8—9 thereon which project laterally from said collar.

A sleeve 10 is rotatably mounted on the shell 5 and rests upon a shoulder on the collar 7, and a retaining collar 11 is secured to the said shell above the sleeve 10 to retain said sleeve in position thereon and against longitudinal movement on the shell.

A pair of gripping members 12 are mounted upon said sleeve, each comprising a gripping portion 13 extending from a shank 14 which projects vertically from a base portion 15 having a downwardly projecting extension 16 that is rotatably contained within a vertical opening 17 in a boss 18 on said sleeve. As clearly shown in Fig. 3, the base portion 15 extends around the sleeve, at opposite sides thereof, and a spring member 19 is positioned between a collar portion 20 on said sleeve and the base portions 15 of the gripping

2 members so as to normally urge said members outwardly and towards open position, as clearly shown in Figs. 5 and 6.

Said sleeve 10 is also provided with bosses 21, which act as stops for the said gripping members, and a retaining plate 22 is provided to retain said gripping members movably upon the sleeve 10 and against longitudinal movement when a pull is exerted on said members in the use of the device.

The shank portions 14 of the gripping members 12 are bent, as at 23, to provide cams which are engaged by extensions 24 on an operating plate 25 that is rigidly secured to a slide bar 26 which is slidable in a boss 27 on the sleeve 10. The said slide bar 26 has an extension 28 which acts as a guide against the edge of the bulb socket to properly position the device relatively thereto, and the gripping fingers 13 of the members 12 are provided with guide plates 29 for guiding said fingers onto the socket.

The retaining collar 11 is notched at 30 to provide stops 31—32 which engage the slide bar 26 to limit rotating movement of the sleeve 10.

The operation of my improved socket manipulating device is as follows:

When it is desired to pull a socket, such as indicated in dotted line at 33 with a bulb 34 thereon, from a holder 35, the said device is first adjusted to the position shown in Figs. 4 and 6, wherein the operating plate 25 is moved upwardly against the bottom of the gripping fingers 13, the extensions 24 are positioned in the upper portion of the shanks 14 above the cams 23, and the said fingers are in open position.

With the device in this position, it is first placed against the socket 33 with the bulb 34 extending through the notch 25—a on the plate 25. The entire device is then pushed upwardly, causing the plate 25 to engage the bottom of the socket 33 and the fingers 12 to slip over the bead 33—a commonly found around the bottom of the socket. This upward movement will force the plate 25 downwardly and carry the extensions 24 to the tops of the cam portions 23, as clearly shown in Fig. 2, and thereby close the fingers 12 to gripping position around the socket 23 and firmly retain them in said position. The downward movement of the plate 25 will move the bar 26 therewith and into engagement with the stop 8 wherein the said bar will position the extensions 24 on top of the cam portions 23.

The device is then moved downwardly to the position shown in Fig. 1 where the fingers 12 grip the socket and engage the top of the bead 33—a, while the plate 25 retains the said fingers firmly locked in gripping position around the socket by means of the extensions 24 resting upon the tops of the cam portions 23.

The device may now be pulled downwardly, by means of the pole 6, to pull the socket 33 from the holder 35. After the socket has been removed from the holder, it may be detached from the manipulator by simply rotating the sleeve 10 upon the shell 5 to bring the bar 26 against the stop 32, on the collar 11, and out of engagement with the stop 8.

The plate 25 may then be moved downwardly to the position shown in Fig. 5, wherein the bottom end of the bar 26 abuts the stop 9 and the extensions 24 are out of engagement with the cam portions 23, the fingers 12 are open and the socket 33 may be removed from the device.

When it is desired that the device be used for returning a socket to the holder 35, the socket is first placed between the fingers 12 and the device is adjusted as shown in Fig. 1 with the bottom of the bar 26 resting upon the stop 8. The socket is then raised into position to insert the prongs 33—b thereon into the holder, and pushed into place. It will be noted that, as long as the end of the bar 26 rests upon the stop 8, the extensions 24 on the plate 25 will remain upon the cam portions 23 and the fingers 12 will be retained in gripping position.

After the socket has been attached to the holder, the shell 5, with the collar 7, is rotated counterclockwise thus bringing the stop 8 out of engagement with the bar 26. The device is then lifted, causing the plate 25 to be moved downwardly and thereby carrying the extensions 24 below the cam portions 23 and permitting the fingers 12 to open under tension of the spring 19 and release the socket. The device may then be withdrawn, thus leaving the socket and bulb therein attached to the holder 35.

From the above description, it will be clearly understood that the operation of my improved socket manipulator to grip, or to release, a socket is controlled entirely by rotation of the shell 5, which is attached to the pole 6, within the sleeve 10; or by relative movement between the said shell and sleeve. The said movement is controlled by the stops 31—32 and the entire load, applied by pulling upon the gripping fingers, will be taken up by the plate 22.

It will be also noted that the said plate 22 may be easily removed, should it become necessary to replace the fingers 12, by withdrawing the lock pin 11—a, to detach the collar 11 from the end of the shell 5, and then removing the screws 22—a to permit removal of the portion 16 from the shell 5.

I claim:

1. A manipulator of the character described comprising a supporting member adapted to be secured to the end of a pole or extension, a pair of gripping fingers carried by said extension, and cam means controlled by longitudinal movement of said supporting member with said fingers to cause operation of said fingers.

2. A device of the character described comprising a supporting member adapted to be secured to the end of a pole or the like, a sleeve rotatable on said supporting member, a pair of gripping members swivelly secured to said sleeve, a cam portion on said gripping members, an operating member slidable on said gripping members and having an extension in operative engagement with said cam portion, for operating said gripping members, and stop means rotatable with said supporting member and relatively to said sleeve for controlling the operation of said operating member and thereby the movement of said extension relatively to said cam portion.

3. A device of the character described comprising a supporting member, a sleeve rotatable on said member, a pair of gripping members swivelly secured to said sleeve, means for retaining said gripping members upon said sleeve, cam portions on said gripping members, a bar slidable in said sleeve, means carried by said bar and cooperative with said cam portions for operating said gripping members, and stop means carried by said sleeve and rotatable relatively to said carrier for controlling the sliding movement of said bar and therethrough of said operating means.

4. A device of the character described comprising a supporting member adapted to be secured to the end of a pole or extension, a sleeve rotatable on said supporting member, a pair of gripping members swivelly secured to said sleeve, said gripping members having a vertical portion, a lateral extension with a downwardly projecting end portion swivelly connected to said sleeve and a lateral extension in the upper end of said vertical portion for engaging a light socket, cam means on said vertical portion, a member slidable on said vertical portion and cooperative with said cam means for operating said gripping members, a bar connected to said slidable member and slidable in said sleeve, and stop means on said supporting member adapted to abut the end of said bar and thereby control the movement of said slidable member and therethrough the operation of said gripping members.

5. A device of the character described comprising a supporting member adapted to be secured to the end of a pole or extension, a sleeve rotatable on said supporting member, a pair of gripping members swivelly secured to said sleeve; said gripping members each comprising a downwardly extending portion extending through an opening in said sleeve for swivelly securing the gripping member, a portion extending laterally from said end portion, a portion extending vertically from said lateral portion, and a curved portion extending laterally at the top of said gripping members, the said top portions of the opposite gripping members being curved towards each other to provide a gripping loop corresponding to the peripheral surface of a socket, means secured to said sleeve and engaging said lower lateral extension to resist pull exerted on said gripping members, a retaining collar secured to said supporting member for securing said sleeve to the support, a supporting collar secured to said support below the sleeve, extensions on said latter collar providing stops, cam means for operating said gripping members, an operating plate cooperative with said cam means, and a bar secured to said plate and slidable in said sleeve; the end of said bar abutting said stops whereby the movement thereof is limited to control the operation of the cam means by relative rotation between said sleeve and supporting member for moving the stops into or out of operating position relatively to said bar, and separate stop means on said retaining collar adapted to abut said bar for limiting the rotation of said sleeve and thereby locating said bar relatively to the stops on said supporting collar.

6. A device of the character described comprising a supporting member adapted to be secured to the end of a pole or the like, a sleeve rotatable on said supporting member, projections on said sleeve, a pair of gripping members swivelly secured to said sleeve, each of said gripping members having a pivoting portion extending through openings in said projections, lateral portions on said gripping members extending partially around said sleeve and in opposite directions, spring means between said lateral portions for urging said gripping members towards open position, cam means on said gripping members, a bar slidable through an opening in one of the projections in said sleeve, an operating member carried by said bar, an extension on said member engageable with said cam means for operating said gripping members, a supporting collar on said support for positioning said sleeve thereon and having extensions forming stops cooperative with said bar to limit the movement of said operating member, a retaining collar upon said supporting member for resisting movement of the sleeve through pulling action on said gripping members, and separate stop means for positioning said bar relatively to the stops on the said supporting collar.

7. A device of the character described comprising a supporting member adapted to be secured to the end of a pole or extension, a carrier rotatable on said supporting member means swivelly carried upon said carrier for gripping a socket, spring means urging said gripping means towards open position, an operating member engageable with said socket and operable by movement of the manipulator relatively to said socket for controlling said gripping means, and means operable by rotation of said supporting member relatively to said carrier for controlling the operation of said operating member.

8. A device of the character described comprising a shell adapted to be secured to the end of a pole or a supporting shoulder on said shell, a sleeve rotatable on said shell, a pair of gripping members swivelly secured to said sleeve and adapted to grip an electric socket, spring means urging said gripping members towards open position, a retaining collar secured to said shell, a bar slidably mounted in said sleeve, cam means on said gripping members, an operating member carried by said bar and operable by engagement with said socket and cooperative with said cam means for controlling the operation of said gripping members, and stop means on said shell adapted to be brought into position relatively to said slide bar for controlling the operation of said operating member.

9. A device of the character described comprising a supporting member adapted to be secured to the end of a pole or extension, a carrier rotatable on said supporting member, a pair of gripping members swivelly secured to said carrier, spring means urging said gripping members towards open position, socket engaging portions on said gripping members, cam means on said gripping members, an operating member, extensions on said operating member adapted to engage said cam means for closing said gripping members to gripping position against the tension of said spring, a bar secured to said operating member and slidable in said carrier, a stop on said supporting member abutting the end of said bar for locating said operating member relatively to said cam means, the said stop being movable by rotation of said supporting member relatively to said sleeve to disengage said bar and permit further movement of said operating member, to release said cam means and thereby cause opening movement of said gripping members through the tension of said spring.

10. A device of the character described comprising a supporting member, a carrier rotatable on said supporting member, a collar for positioning said carrier, a pair of gripping members secured to said carrier, spring means urging said gripping members towards open position, cam means on said gripping members, an operating member having portions cooperating with said cam means to control the operation of said gripping members, a bar slidably mounted in said carrier, a supporting shoulder on said support, and stop means on said support operable by rotation of said supporting member relatively to said sleeve to permit movement of said member by engagement with a socket relatively to said cam means for causing said gripping members to close; the said stop means being also adapted to be moved to another position to permit further movement of said operating member to release said cam means and thereby cause opening movement of said gripping members through the tension of said spring.

GEORGE R. CHADSEY.

REFERENCES CITED

The following references are of record in the file of this patent:

UNITED STATES PATENTS

| Number | Name | Date |
|---|---|---|
| 1,121,759 | Printiss | Dec. 22, 1914 |
| 2,280,422 | Harcos | Apr. 21, 1942 |
| 2,405,760 | Shaks | Aug. 13, 1946 |

FOREIGN PATENTS

| Number | Country | Date |
|---|---|---|
| 21,486 | Great Britain | Nov. 27, 1900 |
| 53,609 | Sweden | Jan. 12, 1922 |
| 531,647 | France | Oct. 28, 1921 |